July 15, 1969  MIKIJI ITO ET AL  3,455,105

DRIVING DEVICE FOR AN AIR PUMP FOR PURIFYING EXHAUST GAS

Filed Oct. 25, 1966

INVENTORS
MIKIJI ITO
IKUO OKUDA
BY McGlew and Toren
ATTORNEYS

United States Patent Office 3,455,105
Patented July 15, 1969

3,455,105
DRIVING DEVICE FOR AN AIR PUMP FOR
PURIFYING EXHAUST GAS
Mikiji Ito, Nagoya-shi, and Ikuo Okuda, Kariya-shi, Japan, assignors to Nippon Denso Kabushiki Kaisha, Kariya-shi, Aichiki-ken, Japan
Filed Oct. 25, 1966, Ser. No. 589,397
Claims priority, application Japan, May 25, 1966, 41/49,097
Int. Cl. F01n 1/14; F04b 49/02
U.S. Cl. 60—30
2 Claims

ABSTRACT OF THE DISCLOSURE

A device for purifying exhaust gases of an internal combustion engine exhaust line includes an air pump for discharging secondary air to the exhaust lines in order to oxidize the unburned exhaust gases. The pump drive shaft is connected to an input shaft driven by the engine so that it normally rotates at a speed ratio of 1:1 when the engine speed decreases below a predetermined amount. Suitable control means are provided, however, to engage either a mechanical gearing or a clutch mechanism to rotate the pump shaft at a slower speed when the speed of the engine increases above a predetermined value.

SUMMARY OF THE INVENTION

The present invention relates to a driving device for an air pump for pulifying exhaust gas in an exhaust gas purifying apparatus of secondary air injection type in which the secondary air is supplied to an exhaust port of each cylinder of an engine to oxidize the exhaust gas.

Such an exhaust gas purifying apparatus of secondary air injection type has been recognized as the most excellent among the exhaust gas purifying apparatuses in practical use in the United States of America. The most important disadvantage in application of such a purifying apparatus to the engine of a small car is considerable power consumption in the air pump for purifying exhaust gas (referred simply to air pump hereinafter) for the apparatus, and this has a great bad influence upon accelerating performance of the engine. On the other hand the effect of the exhaust gas purifying apparatus of secondary air injection type, that is, satisfactory oxidation of the exhaust gas due to supply of secondary air to the exhaust port of the engine may be performed only in idling and deceleration. In other running conditions, namely, constant speed, high speed and acceleration condition harmful combustibles in the exhaust gas are so small in quantity that the purifying effect is rather insufficient. Thus the capacity of the air pump is determined by the quantity of the secondary air necessary for purifying the exhaust gas in idling when the largest quantity of carbon monoxide is exhausted, for the largest discharging quantity of air is then required for the air pump. The discharging quantity of the air pump increases in proportion to its number of revolutions, while the quantity of air necessary for purifying the exhaust gas does not increase so much on account of decrease in concentration of the harmful combustibles. Further, the experiments have proved that the purifying effect in other than idling generally depends upon presence of the secondary air for purifying and not much upon the quantity of the air. Accordingly, not only in deceleration when the harmful combustibles in a relatively large quantity are exhausted but also in acceleration similar thereto, the discharging quantity of the air pump at each number of revolutions of the engine may exceed the quantity of secondary air necessary for purifying so that the exhaust gas would be cooled by the excess air with result in deterioration in purifying effect on the contrary unless the greater part of the discharging air is let escape into the atmosphere by means of a blow-off valve except in idling. Therefore, the air pump of large capacity capable of supplying necessary quantity of air in idling has hitherto been required while there has been difficulty in letting escape the excess air except in idling, and the power of the engine has been wasted.

It is a principal object of the invention to obviate the above mentioned disadvantages.

It is another object of the invention to provide a driving device for an air pump for purifying exhaust gas which transmits a driving torque of the engine directly to the shaft of the air pump in idling as usual to thereby enable it to discharge a large quantity of the secondary air necessary for purifying and drives the pump shaft at a reduced speed in running conditions other than idling to thereby avoid supply of the excess air.

It is a further object of the invention to reduce power consumption of the air pump as well as load of the engine.

The driving device for an air pump for purifying exhaust gas driven by an engine according to the invention is characterized in that between a pump driving pulley and a pump shaft there are provided an electromagnetic clutch and either a reduction gear having a constant reduction ratio or a fluid coupling in association with each other whereby the pump driving pulley is coupled directly with the pump shaft only at a number of revolutions of the engine close to that in idling while rotation of the pump driving pulley is transmitted to the pump shaft at a reduced ratio, or number of revolutions of the pump shaft is kept below a constant value.

The invention will be explained in connection with the accompanying drawing, in which.

Figure 1:
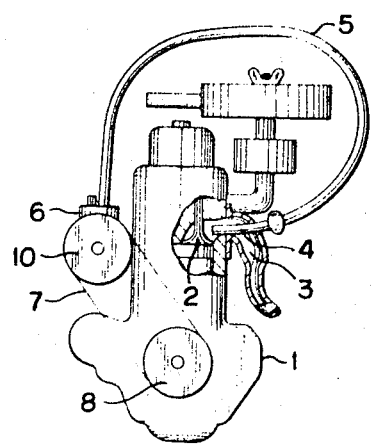
FIG. 1 is a front view of an exhaust gas purifying apparatus of secondary air injection type having an air pump for purifying exhaust gas which is provided with a driving device according to the invention partly in section.
Figure 2:
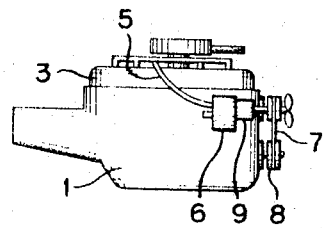
FIG. 2 is a top view of FIG. 1.

Referring now to FIGS. 1 and 2, 1 denotes an engine, 2 an exhaust valve, 3 an exhaust manifold, and 4 a secondary air injection nozzle which is connected to the outlet of an air pump 6 for purifying exhaust gas through an air pipe 5. 7 denotes a pump driving belt which is belted on a crank pulley 8 and a pump driving pulley 10. 9 denotes a driving device for the air pump for purifying exhaust gas in accordance with the invention.

Figure 3:
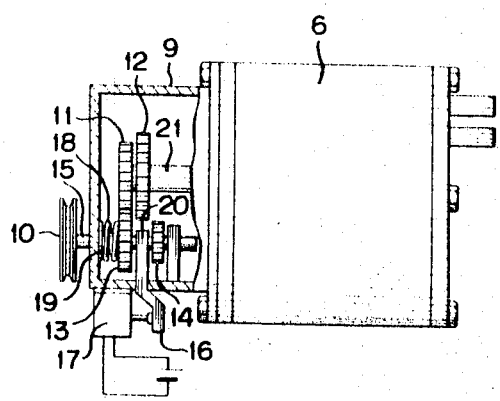
FIG. 3 is a front view of an air pump for purifying exhaust gas which is provided with a first embodiment of the driving device according to the invention partly in section.

In FIG. 3 illustrating a first embodiment of the driving device 9, 15 denotes a spline driving shaft as a pump driving shaft on which the pump pulley 10 is mounted. A driving tooth wheel 13 which fits loosely on the driving shaft 15 engages a driven tooth wheel 11 mounted on a pump shaft 21. The driven tooth wheel 11 has a same number of teeth as that of the driving tooth wheel 13 and therefore rotates at the same speed as that of the driving tooth wheel. On the other hand a driven reduction tooth wheel 12 which is mounted on the pump shaft 21 constitutes a reduction gear together with a driving reduction tooth wheel 14 which also fits loosely on the spline driving shaft 15. The tooth wheel assembly is arranged as follows: When a fork 16 which is put in a slit 20 which is formed between the driving tooth wheel 13 and the driving reduction tooth wheel 14 moves to the left under the action of an energized solenoid 17, the driving tooth wheel 13 is out of engagement with the driven tooth wheel 11 while the driving tooth wheel 14 of the reduction gear comes into engagement with the driven tooth wheel 12. The fork 16 and the solenoid 17 constitutes an electromagnetic clutch. 18 denotes a return spring for returning the driving wheels 13 and 14 to the original position upon deenergization of the solenoid 17, and it is retained at an end thereof by a disc 19 mounted on the spline driving shaft 15.

Figure 4:
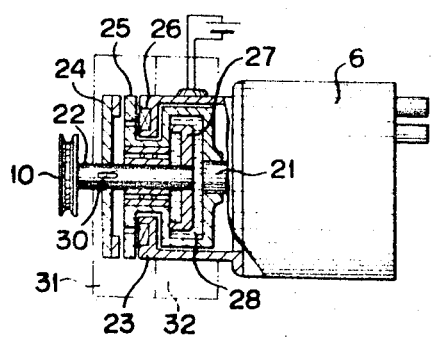
FIG. 4 is a front view of an air pump for purifying exhaust gas which is provided with a second embodiment of the driving device according to the invention partly in section.

In FIG. 4 showing a second embodiment of the invention, between an air pump 6 and a pump driving pulley 10 there are arranged an electromagnetic clutch 31 and a fluid coupling 32 which are mounted on a pump driving shaft 22 and a pump shaft 21 respectively. The pump driving shaft 22 and the pump shaft 21 are arranged coaxially with each other. A pump runner 27 of the fluid coupling 32 is secured to the pump driving shaft 22 on which a pump driving pulley 10 is mounted, while a turbine runner 25 of the fluid coupling 32 is secured to the pump shaft 21. Between both runners 25 and 27 there is filled a fluid 28 having a proper viscosity. 26 denotes a magnet coil which is put in a stator 23 of the clutch 31. A clutch plate 24 is supported on the pump driving shaft 22 so as to slide only axially along a key 30 on it.

The operation of the device described above will be explained hereinafter. When the engine 1 is started, the air pump 6 is driven by the engine through the crank pulley 8, the pump driving belt 7, the pump driving pulley 10 and the driving device 9. Discharged air of the air pump 6 is spurted from the secondary air nozzle 4 into the exhaust port 3 through the air pipe 3, and oxidizes harmful combustibles in exhaust gas which is exhausted from the opening of the exhaust valve 2 to thereby purify the exhaust gas.

In case of the driving device 9 shown in FIG. 3, the solenoid 17 is deenergized in idling at which a large quantity of secondary air is necessary, and the assembly is in a position as shown. Accordingly, a driving torque of the pump driving pulley 10 is transmitted directly to the pump shaft 21 through the driving tooth wheel 13 and the driven tooth wheel 11 in engagement with each other so that the air pump 6 rotates at a predetermined number of revolutions. On the other hand, the solenoid 17 is energized in acceleration, constant speed and deceleration at which a large quantity of secondary air is not necessary, and the fork 16 moves to the left. The driving tooth wheel 14 of the reduction gear, therefore, comes into engagement with the driven tooth wheel 12 whereby the pump shaft 21 is driven at a reduced speed. Since the speed of the air pump 6 does not increase more than necessary in acceleration, constant speed and deceleration, the horse power of the engine 1 necessary for driving the air pump is kept smaller than in case the pump driving pulley 10 is coupled directly with the pump shaft 21.

In case of the driving device 9 shown in FIG. 4, the magnet coil 26 in the stator 23 is energized only in idling. Accordingly the clutch plate 24 is attracted to a clutch disc which is a part of the turbine runner 25 under the action of the magnet coil 26 so that the pump driving shaft 22 rotates together with the pump shaft 21 as one body whereby a quantity of air necessary for purifying exhaust gas may be discharged from the air pump 6. In case the concentration of harmful combustibles in the exhaust gas is low as in acceleration and constant speed, the electromagnetic clutch 31 is not actuated. Then the pump shaft 21 is coupled with the driving shaft 22 only through the fluid coupling 32. When number of revolutions of the driving shaft 22 exceeds a certain value, slip occurs between the pump runner 27 and the turbine runner 25 on account of viscosity of the fluid 28 so that the pump shaft 21 rotates at a constant speed above a predetermined number of revolutions of the driving shaft 22. In other words number of revolutions of the air pump does not exceed a predetermined valve, even when the speed of the engine 1 increases too high. Thus the air pump 6 in acceleration and constant speed is not driven at a speed more than necessary and this results in reduced power consumption of the engine 1 in the same manner as in the first embodiment.

As a means for controlling energization of the solenoid 17 or the magnet coil 26 of the electromagnetic clutch in the above embodiments there may be provided a small generator 1 which is coupled with the engine 1 and whose output voltage is derived for controlling.

As described above, in an air pump for purifying exhaust gas driven by an engine according to the invention, between a pump driving pulley and a pump shaft there are provided an electromagnetic clutch and either a reduction gear having a constant reduction ratio or a fluid coupling in association with each other whereby the pump driving pulley is coupled directly with the pump shaft only at a number of revolutions of the engine close to that in idling while rotation of the pump driving pulley is transmitted to the pump shaft at a reduced ratio, or the number of revolutions of the shaft is kept below a constant value. Advantages obtained from the driving device having the above feature are as follows: In idling a large quantity of secondary air necessary for purifying may be supplied from the air pump which is kept in a stationary rotation while in running conditions other than idling production of excess air by the air pump may be avoided on account of reduced speed of the pump shaft with respect to the pump driving pulley, and this reduces power consumption of the pump itself as well as load of the engine. Consequently an exhaust gas purifying apparatus of secondary air injection type using a small engine may be kept from deterioration in the accelerating performance of the engine and this has enabled a purifying apparatus of high efficiency to be created.

What is claimed is:

1. A device for purifying exhaust gases of an internal combustion engine exhaust line, comprising an air pump for discharging secondary air to the exhaust line to oxidize unburned exhaust gases, said air pump having a pump drive shaft, driving motor means, an input shaft connected to said driving motor means and rotatable thereby and directly connected to said pump drive shaft to rotate said pump drive shaft, and clutch speed control means connected between said input shaft and said pump drive shaft for selectively driving said pump shaft at a reduced speed upon increase in speed of said input shaft beyond a predetermined amount to vary the delivery of air by said pump in accordance with the requirements for secondary air in the exhaust line, said clutch means including a fluid drive between said input shaft and said pump shaft, said fluid drive including a stator having an energizing coil and a rotor connected to said input shaft and being displaceable upon energization of said coil to cause engagement of said rotor for driving said pump shaft from said input shaft.

2. A device for purifying exhaust gases of an internal combustion engine exhaust line, comprising an air pump for discharging secondary air to the exhaust line to oxidize unburned exhaust gases, said air pump having a pump drive shaft, driving motor means, an input shaft connected to said driving motor means and rotatable thereby and directly connected to said pump drive shaft to rotate said pump drive shaft, and clutch speed control means connected between said input shaft and said pump drive shaft for selectively driving said pump shaft at a reduced speed upon increase in speed of said input shaft beyond a predetermined amount to vary the delivery of air by said pump in accordance with the requirements for secondary air in the exhaust line, said clutch means including a clutch plate carried by said input shaft and being axially displaceable therealong, a turbine rudder connected to said pump shaft and being rotatable with said pump shaft, said turbine rudder defining a chamber filled with fluid, an input rudder connected to said input shaft and rotatable in the fluid of said chamber for rotating said turbine rudder and said pump shaft upon rotation of said input shaft, a stator having an energizing coil disposed at an axial spaced alignment with said clutch plate, said coil being energizable to displace said clutch plate to engage said turbine rotor for rotation of said clutch plate with said rudder.

References Cited
UNITED STATES PATENTS

| | | | |
|---|---|---|---|
| Re. 25,787 | 6/1965 | Gary | 60—30 |
| 3,303,003 | 2/1967 | Zimmer | 60—30 |

CARLTON R. CROYLE, Primary Examiner

D. HART, Assistant Examiner

U.S. Cl. X.R.

230—15